United States Patent
Taylor

(10) Patent No.: US 7,741,813 B2
(45) Date of Patent: Jun. 22, 2010

(54) METHOD AND SYSTEM FOR MANAGING BATTERY INVENTORY

(75) Inventor: James Ellis Taylor, Tupelo, MS (US)

(73) Assignee: AT&T Intellectual Property I, L. P., Reno, NV (US)

( * ) Notice: Subject to any disclaimer, the term of this patent is extended or adjusted under 35 U.S.C. 154(b) by 657 days.

(21) Appl. No.: 11/611,609

(22) Filed: Dec. 15, 2006

(65) Prior Publication Data

US 2008/0143296 A1 Jun. 19, 2008

(51) Int. Cl.
*H02J 7/00* (2006.01)

(52) U.S. Cl. ................. 320/134; 320/162

(58) Field of Classification Search ............. 320/134, 320/162; 324/426; 700/90
See application file for complete search history.

(56) References Cited

U.S. PATENT DOCUMENTS

| 6,611,774 B1* | 8/2003 | Zaccaria ............... 702/63 |
| 2005/0206388 A1* | 9/2005 | Quint et al. ............. 324/430 |
| 2006/0071643 A1* | 4/2006 | Carrier et al. ............ 320/132 |

\* cited by examiner

*Primary Examiner*—Jay M Patidar
*Assistant Examiner*—Aaron Piggush
(74) *Attorney, Agent, or Firm*—Scott P. Zimmerman PLLC

(57) ABSTRACT

Provided are a method and a system for inventorying batteries. In exemplary embodiments, a computer assisted method for inventorying batteries includes identifying a battery string at a location and reading battery identification data associated with one or more batteries in the battery string which includes a battery voltage. After reading the battery identification data and aggregating the magnitudes of the battery voltages in the battery string, if the aggregate of the magnitudes of the voltages is not equal to a required voltage then an error message is generated. If the aggregate of the voltages of the batteries is equal to the required voltage then the process may be repeated for the next string, if any, at the location.

11 Claims, 16 Drawing Sheets

435

| COL | TITLE | DESIGN | DESCRIPTION |
|---|---|---|---|
| A | MANUF_ID | 2 TEXT | MANUFACTURE ID, VALID AS THE 1ST TWO CHARACTERS OF THE BATTID |
| B | MANUFACTURER | 50 TEXT | MANUFACTURER NAME. |
| C | MODEL_ID | 25 TEXT | BATTERY MODELID |
| D | VOLT | 4 NUMBER | BATTERY VOLTAGE |
| E | AHR | 4 NUMBER | BATTERY AH RATING |
| F | LBS_ACID | 10 NUMBER | POUNDS OF H2S04 |
| G | AKA | 50 TEXT | AKA |
| H | BV_COMMENTS | 200 TEXT | UNKNOWN. |
| I | ENCLOSURE | 125 TEXT | ENCLOSURES WHERE USED. |
| J | GAL_ELECTRO | 10 NUMBER | GALLONS OF ELECTROLYTE |
| K | WARRANTY | 10 NUMBER | MANUFACTURER'S WARRANTY IN YEARS. |
| L | PER_H2SO4 | 10 NUMBER | PERCENT H2SO4 |
| M | SPECIFIC_GRAV | 10 NUMBER | BATTERY SPECIFIC GRAVITY. |
| N | SUBTYPE | 15 TEXT | SUB-TYPING OF BATTERY USED DUE TO AMBIGUOUS MODELID'S. NOTE: WHEN PRESENT, THIS VALUE MUST BE USED AS "MODEL_ID AND SUBTYPE" TO ACCURATELY INVOKE THE STRING VOLTAGE TEST. |
| O | LBS_LEAD | 15 NUMBER | LEAD WEIGHT PER BATTERY |
| P | LBS_TOTAL | 15 NUMBER | UNKNOWN. |
| Q | COST | 12 NUMBER | BATTERY COST FOR MODELING ON THE HOST. |
| R | LABOUR | 12 NUMBER | BATTERY REPLACEMENT. |
| S | FUTURE1 | 255 TEXT | FUTURE USE. |
| T | FUTURE2 | 255 TEXT | FUTURE USE. |

| WCTR | CLLI | ADDRESS | MODEL ID | VOLT | ENCLOSURE | MANUF. |
|---|---|---|---|---|---|---|
| CRNTMSMA | CRNTMSR5969 | PED 78 HWY 72E | FA12-100BS0000 | 12 | CONC10X12ANDR | C&D |
| CRNTMSMA | CRNTMSR5922 | P 314 HWY 72 W | FA12-125JBS000 | 12 | 8OE CAB | C&D |
| CRNTMSMA | CRNTMSR5923 | P 183 CR 600 | FA12-125JBS000 | 12 | 80D CAB DP | C&D |
| CRNTMSMA | CRNTMSU5174 | P 105 HWY 22 | FA12-125JBS000 | 12 | 80A CAB BULK POWER | C&D |
| CRNTMSMA | CRNTMSU5210 | PED 23 RD 634 | FA12-125JBS000 | 12 | 80A CAB | C&D |
| CRNTMSMA | CRNTMSU5240 | P 84 SHI-LOH RD | FA12-125JBS000 | 12 | 80E CAB | C&D |
| CRNTMSMA | CRNTMSU5280 | P 60 N1 HWY 72 W | FA12-125JBS000 | 12 | 80E CAB | C&D |
| CRNTMSMA | CRNTMSU5385 | P1 CR 605 | FA12-125JBS000 | 12 | 80E CAB | C&D |
| CRNTMSMA | CRNTMSU5166 | P 145 HWY 72 W | FA12-125JBS000 | 12 | 80E CAB | C&D |
| CRNTMSMA | CRNTMSU5622 | P1 SALEM ROAD | FA12-125JBS000 | 12 | 80C CAB | C&D |
| CRNTMSMA | CRNTMSU5626 | P39 HWY22NORTH | FA12-125JBS000 | 12 | 80A CAB | C&D |
| CRNTMSMA | CRNTMSU5957 | P 62 RD 512 | FA12-100JBS000 | 12 | MESASP | C&D |
| CRNTMSMA | CRNTMSU5822 | P1 RD 512 | 6SLA1600000000 | 6 | MESA2 | FIAMM |
| CRNTMSMA | CRNTMSU5750 | PED 75 HWY 22 N | LS12-25JBS000 | 12 | 80D CAB DP | C&D |
| CRNTMSMA | CRNTMSU5776 | P 22 SALEM RD | LS12-25JBS0000 | 12 | 80D CAB DP | C&D |
| CRNTMSMA | CRNTMSU5954 | 3X CR 116 | 6SLA1600000000 | 6 | MESA4 | FIAMM |
| CRNTMSMA | CRNTMSU5954 | 3X CR 116 | 6SLA1600000000 | 6 | MESA4 | FIAMM |
| CRNTMSMA | CRNTMSCAH01 | 2682 SHARPER RD | LS12-25JBS0000 | 12 | 90A CAB | C&D |
| | | | TOTAL BATTERIES | | TOTAL LABOR | |
| | | | 228 | | $7,626 | |

FIG. 8A

STATE: MS
DIVISION: TUPL

| CURRENT AGE | FORECAST AGE | NUM BATTS | TOTAL LABOR | TOTAL MAT. | TOTAL COST |
|---|---|---|---|---|---|
| 7.28 | 7.42 | 12 | $960 | $1,680 | $2,640 |
| 6.45 | 6.58 | 16 | $608 | $4,080 | $4,688 |
| 6.45 | 6.58 | 8 | $304 | $2,040 | $2,344 |
| 6.45 | 6.58 | 8 | $304 | $2,040 | $2,344 |
| 6.45 | 6.58 | 8 | $304 | $2,040 | $2,344 |
| 6.45 | 6.58 | 16 | $608 | $4,080 | $4,688 |
| 6.45 | 6.58 | 16 | $608 | $4,080 | $4,688 |
| 6.45 | 6.58 | 16 | $608 | $4,080 | $4,688 |
| 6.28 | 6.42 | 16 | $558 | $1,617 | $2,175 |
| 6.28 | 6.42 | 36 | $304 | $2,040 | $2,344 |
| 6.28 | 6.42 | 8 | $320 | $560 | $880 |
| 6.12 | 6.25 | 4 | $304 | $1,184 | $1,488 |
| 5.87 | 6 | 8 | $186 | $539 | $725 |
| 5.7 | 5.83 | 12 | $186 | $539 | $725 |
| 5.7 | 5.83 | 12 | $304 | $1,184 | $1,488 |
| 5.45 | 5.58 | 8 | $304 | $1,184 | $1,488 |
| 6.37 | 5.5 | 8 | $248 | $719 | $967 |
| 4.87 | 5 | 16 | TOTAL COST | | $45,392 |
| | | TOTAL MATERIAL | | $37,766 | |

FIG. 8B

METHOD AND SYSTEM FOR MANAGING BATTERY INVENTORY

BACKGROUND

Since its inception, analog telephone service ("Plain Old Telephone Service" or "POTS") providers have utilized a DC line voltage ("DCLV") equal to −48V. The DCLV is generated from the telephone system Central Office or from a relay station and is supplied to customers as a constant −48V when the phone is on hook. The DCLV has various purposes including initiating a telephone call and corrosion control along the POTS twisted pair telephone lines.

During occasions of a municipal power outage, telephone service providers use batteries as a backup −48 VDC voltage source in order to maintain telephone service to customers until normal power sources can be restored. Direct current batteries are installed at a myriad of Central Offices and Digital Loop Electronics ("DLE") Remote Terminal ("RT") locations along the telephone system in what may be called wire centers. Each wire center may have multiple RT sites, which could be a cabinet or other structure type such as a hut or Controlled Environmental Vault ("CEV"). Each RT site may have a string or multiple strings of batteries in series capable of providing −48 VDC to its segment of the POTS network.

Telephone networks today are extremely large and may consist of tens of thousands of remote sites spread across a number of states. Those remote sites may contain hundreds of thousands if not millions of batteries of different voltages, makes and models. All of those batteries must be tracked to ensure that depleted batteries are replaced, that all sites have a full complement of batteries installed, that installed batteries are compatible with each other and that the proper DCLV is produced when required. Difficulties have arisen in monitoring such a large inventory of batteries by a widely dispersed force of technicians with varying levels of training. Further, manufacturer recalls of defective batteries has also proven problematic as the defective batteries must be culled from the inventory in a timely manner and replaced with compatible substitutes. Failure to maintain battery strings with the requisite −48 VDC DCLV may negatively impact the performance of a telephone system and the cost of holding depleted batteries may be large. Therefore a standardized, computer assisted inventory method is needed to maximize the performance and minimize the cost of maintaining a battery back up system.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Exemplary embodiments include a computer assisted method for inventorying batteries. The method begins by identifying a battery string to be inventoried and reading the battery identification data associated with each of the one or more batteries that may be connected in the battery string. The battery identification data for each battery includes a battery voltage. After reading the battery identification data, the magnitudes of the battery voltages in the battery string are aggregated and compared to a required voltage, then it is determined if the aggregate of the magnitudes of the battery voltages is not equal to a required voltage and, if so, then an error message is generated. If the aggregate of the voltages of the batteries is equal to the required voltage then the process is repeated for the next battery string.

Other exemplary embodiments include a computer readable medium with instructions to identify a battery string and read battery identification data associated with one or more batteries in the battery string. The battery identification data includes a battery voltage. When a string inventory is completed, the magnitudes of the battery voltages in the battery string are aggregated. If the aggregate of the magnitudes of the voltages in a battery string is not equal to a required voltage then an error message is generated. If the aggregate of the voltages of the batteries is equal to the required voltage then the battery identification data is stored and the process repeated for the next string at the location.

In accordance with other exemplary embodiments, an apparatus is provided to inventory batteries comprising a computing device, an inventory software application executing on the computing device and a data reader capable of reading the battery identification data into the inventory software application.

Other apparatuses, methods, and/or computer program products according to embodiments will be or become apparent to one with skill in the art upon review of the following drawings and Detailed Description. It is intended that all such additional systems, methods, and/or computer program products be included within this description, be within the scope of the present invention, and be protected by the accompanying claims.

BRIEF DESCRIPTION OF THE DRAWINGS

FIG. 5 is an exemplary field layout for a battery vendor table.

FIGS. 8A and 8B is a screen shot of an exemplary battery inventory report.

DETAILED DESCRIPTION

Figure 1:
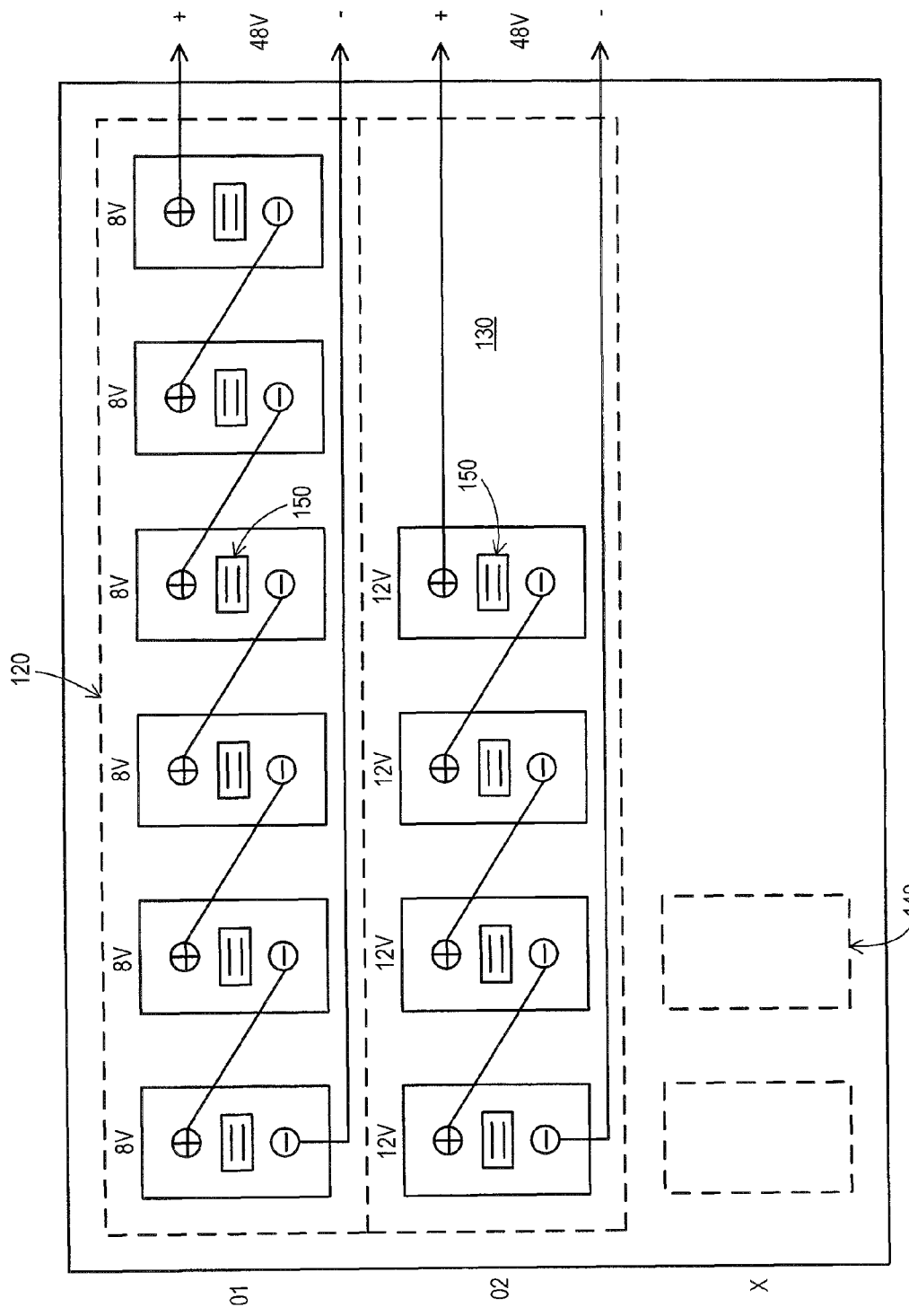
FIG. 1 is a diagram of a location with an exemplary battery string installed.

The following detailed description is directed to an apparatus and method for inventorying batteries. In the following detailed description, references are made to the accompanying drawings that form a part hereof and which are shown, by way of illustration, using specific embodiments or examples.

Referring now to the drawings, in which like numerals represent like elements through the several figures, aspects of the apparatus and methods provided herein will be described.

FIG. 1 is a diagram illustrating a battery location and the batteries contained within. A battery location may be in any Central Office, switching station or any other substation of the POTS capable of securely storing batteries and connecting them to the POTS. A battery string may also be used to provide back up power for ADSL service, video service, T1 service to cellular sites and other high speed services. Such a substation may be known as a Wire Center. A remote location within a Wire Center may be uniquely identified by a location code or location data string. As a non-limiting example, a location code may be a Common Language Location Identifier (CLLI™), a trademark of Telcordia. A CLLI code is an 8-11 character code used to uniquely identify locations. Typically these codes contain City and State data for geographic groupings of locations. In the United States, the first four characters may be the City mnemonic and the next two characters may represent the State. There may be one or more CLLI's within a Wire Center location.

A CLLI may require one or more sets of batteries (a "battery string") in order to provide an adequate backup potential (i.e. −48V DCLV) for all of the circuits served by the CLLI. FIG. 1, illustrates an example of a CLLI with two battery strings 120/130 with a position for a third 140. A CLLI may have any number of battery strings and is not limited to three as depicted in the example in FIG. 1. Battery strings may be labeled with a number ("01, 02, 03, . . . "), however the labeling scheme is merely a matter of user preference and in no way should be considered as limiting. In order to deliver a 48V voltage, battery strings in this example must comprise a sufficient number of batteries in series to total 48V. The 48V total is merely a function of the system for which the batteries are being used and should in no way be construed as limiting the disclosure herein. A system other than a POTS may require a DC voltage at a level higher or lower than 48V.

Continuing the example of FIG. 1, battery string 01 120 within the CLLI 110 may be made up of 8V batteries 121-126. To produce a 48V source, six batteries must be connected in series. As an alternative example, battery string 02 130 is made up of 12V batteries 131-134. To produce a 48V source, four batteries must be connected in series. However, in other applications, the number of batteries, voltage of the batteries and mixture of battery types in a battery string may be set to satisfy a user's design requirement. A particular user may require all batteries in a battery string to be of uniform voltage or to be comprised of specific approved battery models.

Each battery in a CLLI and each CLLI may have a data label 150. The data label may contain data in any of a variety of media types. The data label 150 may contain data in any readable form that my suit a user. As a non-limiting example, the data labels may contain information in bar code form or as plain text. As further non-limiting examples, the data may also be contained in a Radio Frequency Identification ("RFID") device or a magnetic strip. Data label 150 may use a combination of media types. Should a user desire to utilize a bar code, the bar code may be of any available type. As non-limiting examples, bar codes may be linear symbology ("1D") bar codes (i.e. Code 11-39 or 128), two dimensional ("2D") bar codes (i.e. Micro-PDF417 codes) or a combination of the two such as the TLC-39 Symbology that may have both a 1D and a 2D symbology.

Figure 2:
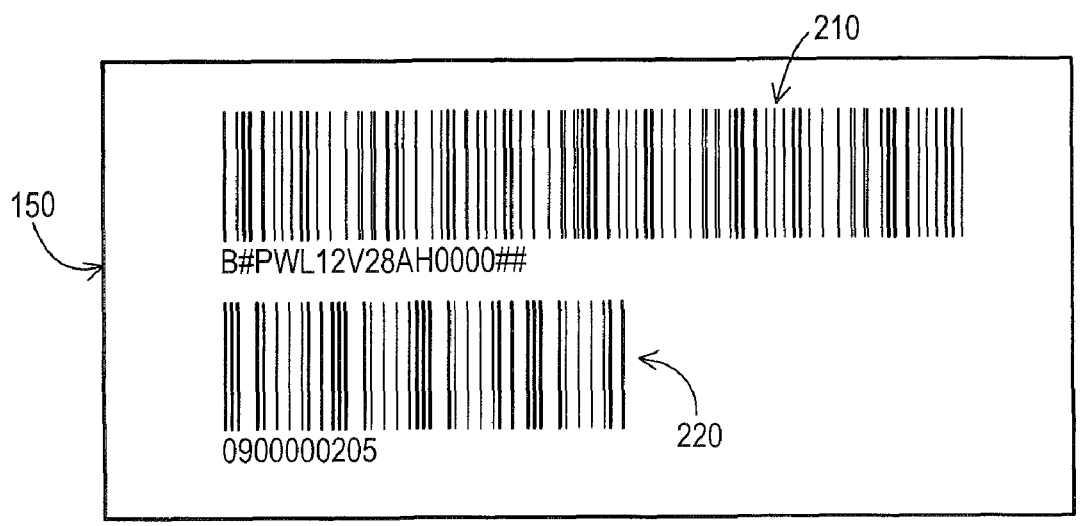
FIG. 2 is a rendition of an example battery ID barcode label that may be affixed to a battery.

Data label 150 may have one or more data sets 210 and 220. A data set may be of a different symbology from other data sets. A non-limiting example of a data label is illustrated in FIG. 2. Each data label may have, for example, Model ID data 210 and Battery ID data 220 (i.e. a Common Language Equipment Identifier (CLEI™)). The Battery ID data 220 may contain information about the equipment. For example the first two characters may designate a manufacturer. The next four characters may identify the equipment and the last four characters may provide the date of installation. However, the data sets may have any type of format desired by the user to affect a specific purpose.

The non-limiting exemplary Model ID data 210 of FIG. 2 may have 18 characters as follows.

b#pwl12v28ah0000##

The first two characters "b#" may indicate that the data is referring to a battery. The remaining fifteen characters may comprise a Model ID where the characters "pwl" may indicate the manufacturer of the battery, the characters "12 v" may comprise the voltage of the battery with the following six characters "ah0000" representing the battery amp-hours rating. The last two characters may represent the string being inventoried. However, the data sets may have any type of format desired by the user to affect a specific purpose.

Figure 3A:
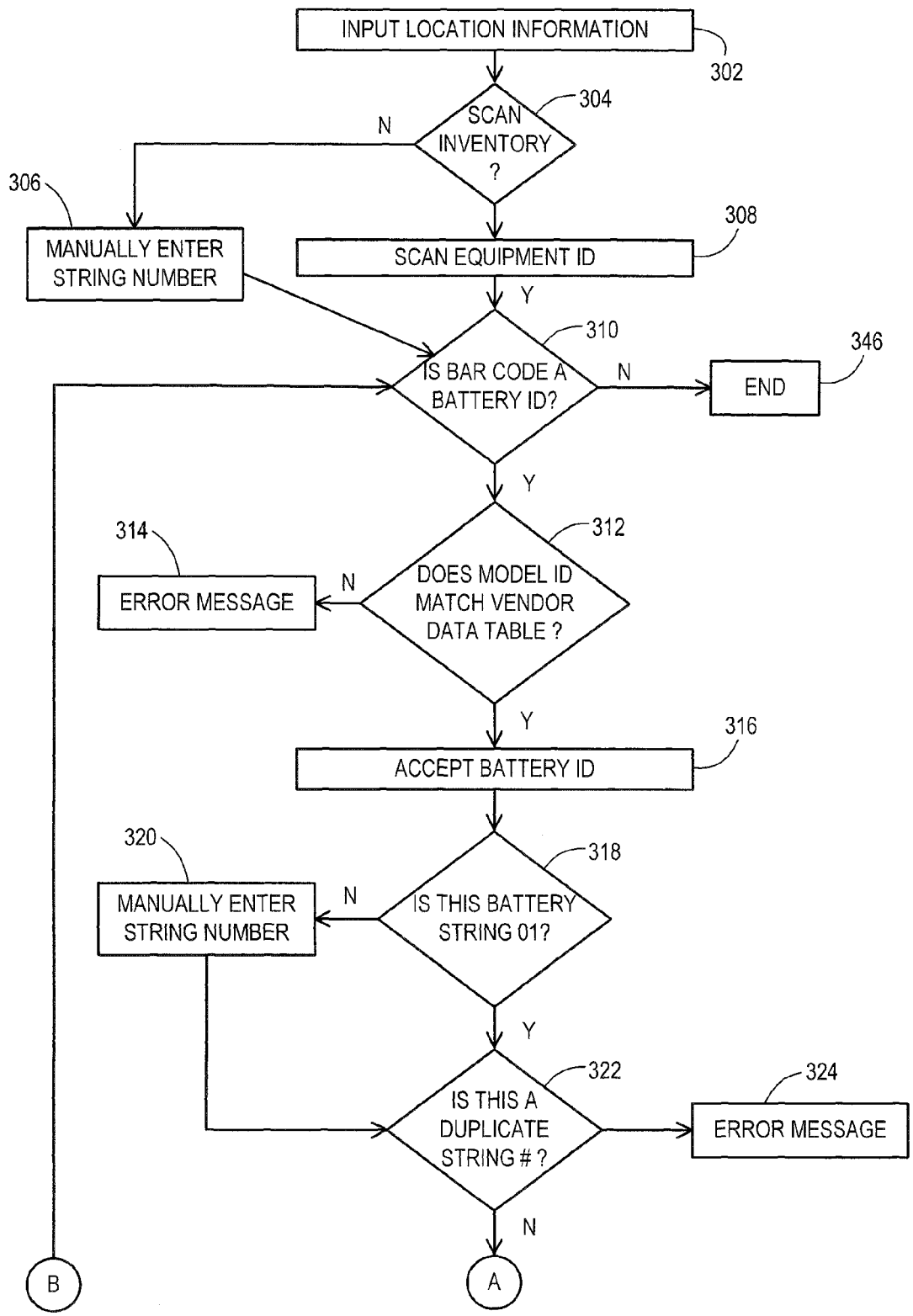
FIGS. 3A and 3B are a flow chart of an exemplary method for inventorying batteries.
Figure 3B:
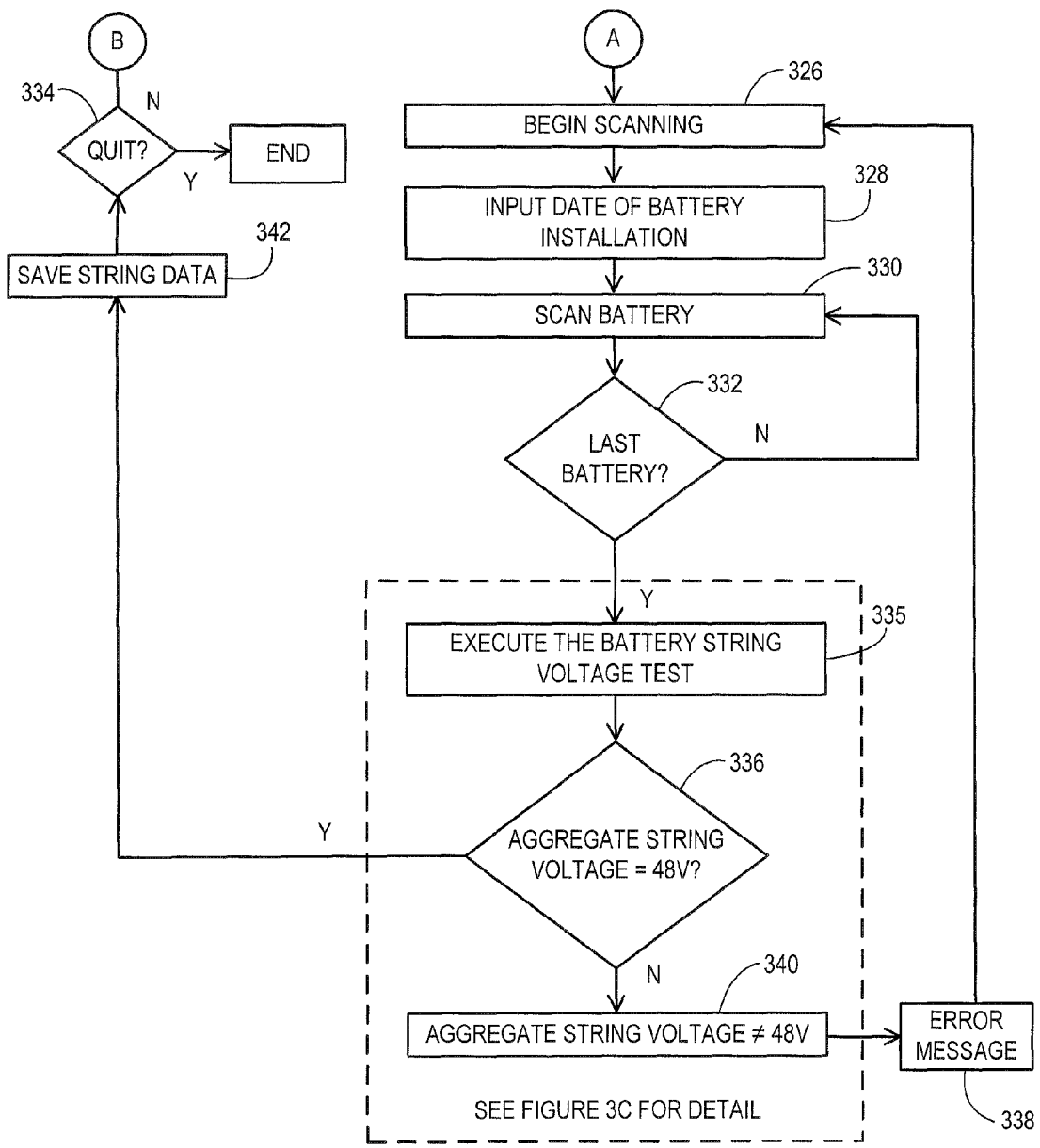
Figure 10:
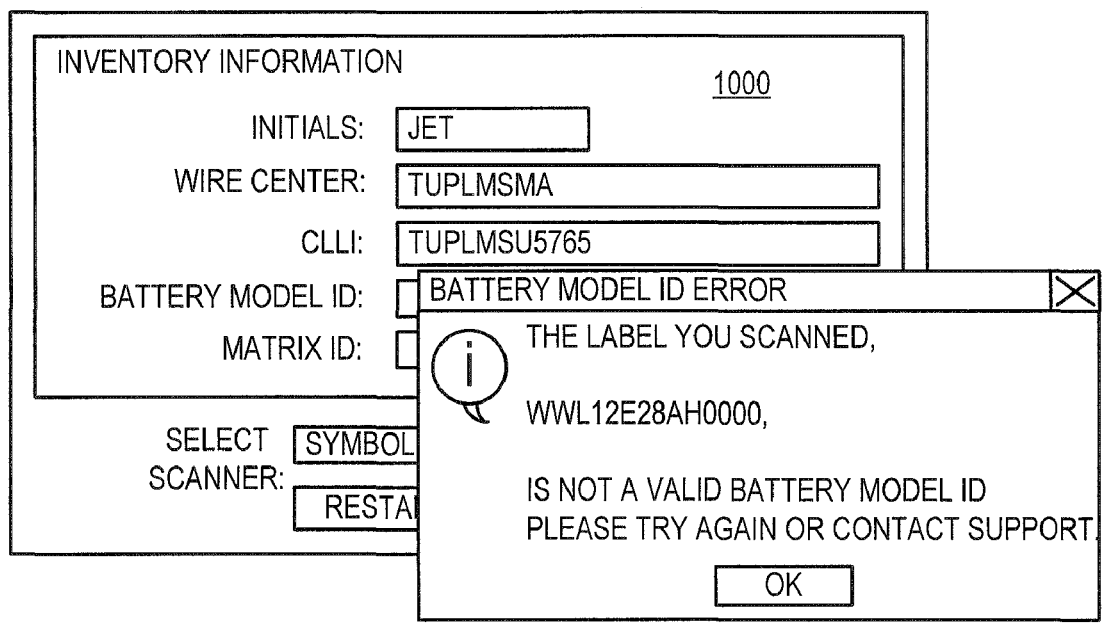
FIG. 10 is an exemplary screen shot of a Model ID error message.

FIG. 3 is a flow chart depicting the method for inventorying batteries. The method begins at process 302 where a user of the method may input location information for the batteries being inventoried. That location information may include a variety of information. For example it may include the user's initials, the wire center being inventoried and the CLLI within the wire center being inventoried. At process 304, the user makes a decision to manually input a Model ID at process 306 or to scan the Model ID at process 308. Since the battery inventory system may share steps and components with an apparatus and method to inventory other types of equipment, the input of a recognized battery as the Model ID notifies the inventory system to execute the steps applicable to the battery inventory system. If a Model ID is not entered, then the method ends at process 346. If a Model ID is entered and recognized as such at decision point 310, then the vendor portion of the Model ID may be checked against a subtending data table within the inventory database at process 312. The subtending data table may be called the Battery Vendor Table (the "bat_ven table"). An example data layout of a Battery Vendor Table is provided in FIG. 4. If the, Model ID is found in the Battery Vendor Table, the system accepts the Model ID at process 316. If the Model ID is not found then an error message 1000 (See FIG. 10) is generated stating that the data label scanned does not contain a valid Model ID at step 314.

Figure 11:
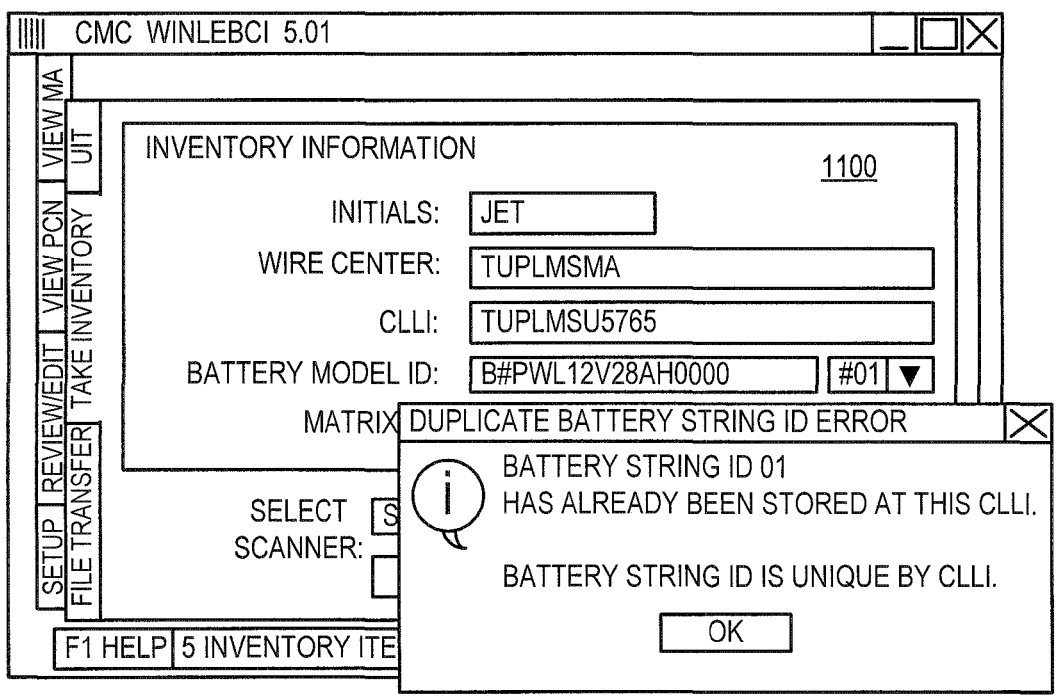
FIG. 11 is an exemplary screen shot of a string error message.

At decision point 318, the system may inquire whether the battery string to be inventoried is battery string number 01. If it is not, then the user may input the actual battery string number being inventoried at process 320. At process 322, the system compares the battery string number being inputted to those strings already inventoried to prevent a duplicate string inventory. If the string being entered has already been inventoried, then the system generates an error message 1100 at process 324 (See FIG. 11) warning that the battery string number has already been stored at this CLLI or location. String 01 may be designated arbitrarily or be an absolute position within a location or CLLI.

At process 326/328, the user may begin the battery inventory for the battery string selected by first inputting the date that the battery string was installed. The battery inventory continues at process 330. Battery inventory input may be done manually for each battery by typing in the Model ID for each battery in the string found on the battery label 150. Alternatively, Model IDs for each battery in a string may be scanned utilizing a data reader such as a bar code reader.

Figure 3C:
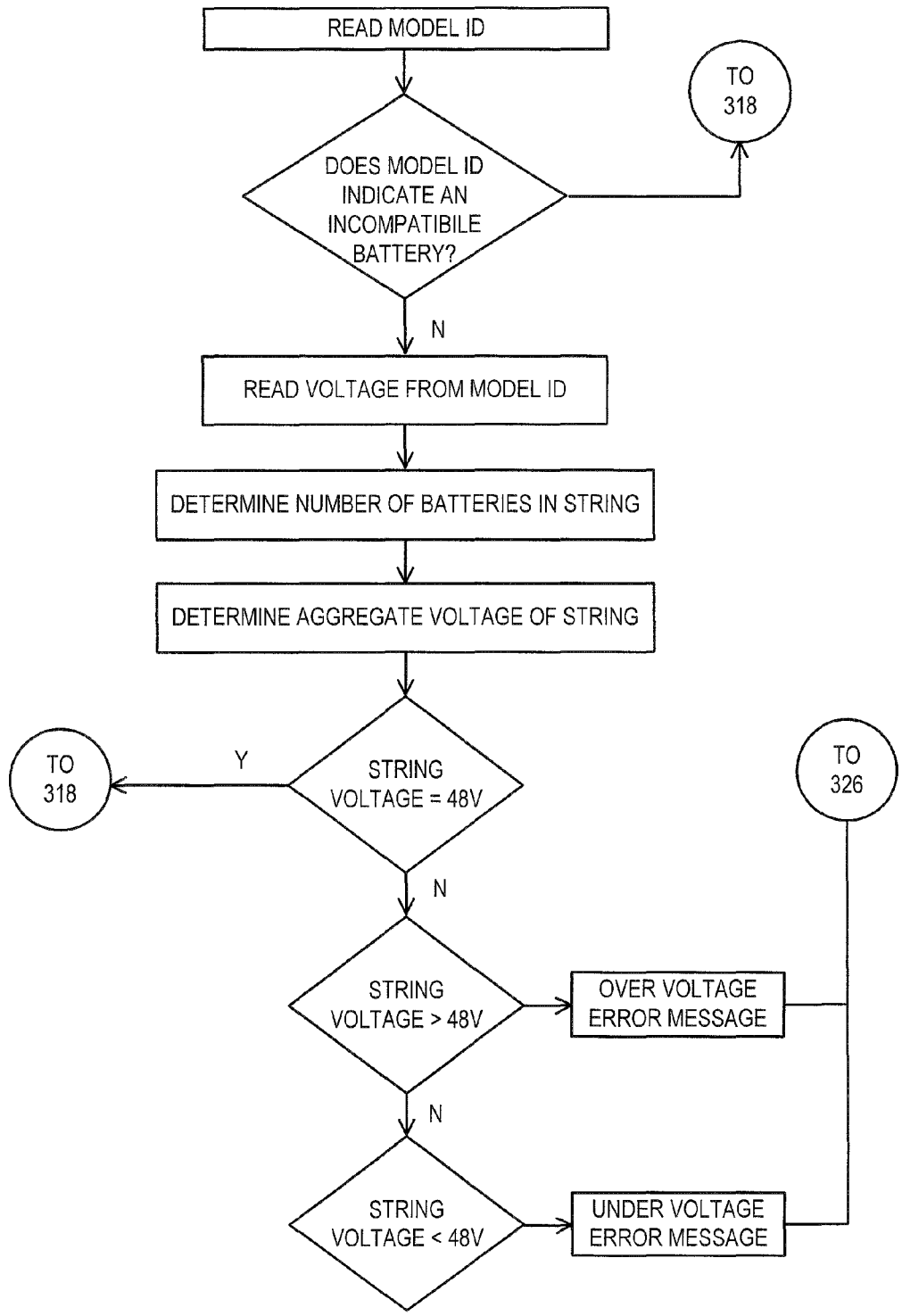
FIG. 3C is a flow chart of an exemplary Battery Voltage Test.

When the last battery in the battery string is reached at decision point 332, a Battery String Voltage Test may be performed at process 335 (See FIG. 3C).

At process 336 if the aggregate string voltage equals the required voltage then the battery string inventory data is saved to the database at process 342. At decision point 344, the user may save the data and quit the system, quit and not save or save and return to process 308 in preparation for scanning the next battery string.

FIG. 3C details an exemplary Battery Sting Voltage Test. At process 333, the Model ID in the string determined during processes 330-332 may be compared to a list of incompatible battery types at process 334. If an incompatible battery is discovered an error message 1100 is generated (see FIG. 11). The incompatible battery can either be physically removed from the string and the inventory repeated at process 326 or the Battery String Voltage Test, infra, may be skipped and the method returned to process 318 to begin a new string.

At process 335 the system calculates the aggregate battery voltage for the string and compares it to a required voltage. At process 335a, the battery voltage for each battery inventoried can be determined in a number of ways. As a non-limiting example, a battery voltage may be parsed from the Model ID of the batteries as they are being inventoried. As an alternative non-limiting example, a database lookup of each battery's Model ID may be done wherein the Model ID is mapped to the battery voltage for that particular battery ID. Further, the system may determine the number of batteries in the string from the battery inventory record at process 335b. As an alternative non-limiting example, the system may track and count the number of each type of batteries as they are scanned in a specific string.

Figure 9A:
FIGS. 9A and 9B are exemplary screen shots of under and over voltage error messages.
Figure 9B:

Once the total number of batteries and the voltages of each battery in the string have been determined, the aggregate voltage magnitude of the battery string is then calculated at process 335c. Such calculation may consist of a summation of each battery voltage in the battery string or a multiplication of a common voltage in the battery string multiplied by the number of batteries in the string. Similarly, an average battery voltage can be determined and then multiplied by the number of batteries inventoried. At process 336, the system compares the aggregate voltage of the string to a required voltage. In the non-limiting example of FIG. 1, the required voltage is 48 v. At decision point 338a, if the aggregate magnitude of the string voltage is greater than 48 v, an over-voltage error 950 (See FIG. 9B) is generated at process 340a. At decision point 338b, if the aggregate magnitude of the string voltage is less than 48 v, an under-voltage error 900 (See FIG. 9A) is generated at process 340b. In either case, the method returns to process 326, to rescan the battery string.

Figure 4:
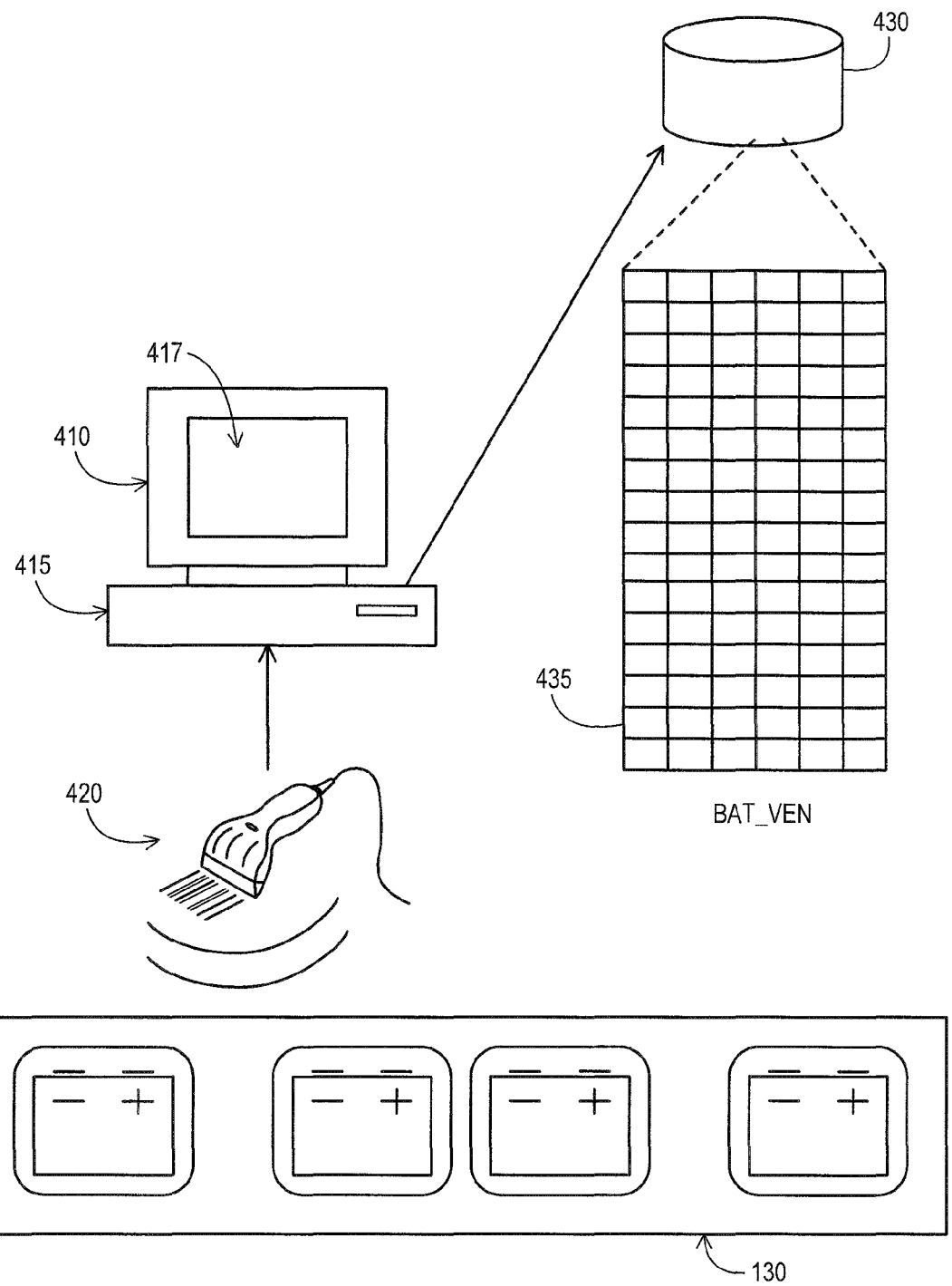
FIG. 4 is an abstract depiction of a system for inventorying batteries consistent with this disclosure.

FIG. 4, illustrates an exemplary apparatus that may be used to inventory batteries according to the disclosed method. Computer 410 may be any computing device, server or processor capable of running the inventory software application 415 and an operating system for data reader 420. Data reader 420 may be any number of custom or off the shelf data readers. A non-limiting list of such data readers may be RFID scanners, magnetic strip readers, magnetic ink readers, OCR scanners, Braille translators and bar code reader/scanners.

Bar code reader/scanners may be capable of reading a linear bar code symbology such as an Intermec 1551E High Density Laser Scanner. An exemplary linear bar code symbology may be the Code 39 symbology. Alternatively, the bar code symbology may be an advanced generation symbology such as the Micro-PDF417 2D symbology. A bar code scanner may be capable of reading either or both of a linear symbology and an advanced 2D symbology. A 2D symbology scanner may be a DS3407 scanner sold by Symbol Technologies.

Further, the data reader 420 may be an RFID reader, and infrared scanner, laser scanner or other device capable of reading a bar code or other battery data formats. The nature of the scanning technology used is a function of the requirements of the system designer and the nature of the inventory data labels 150 best able to fulfill a user's requirements. Data reader 420 may communicate with computer 410 via a cable connection. Alternatively, Data reader 420 may communicate with computer 410, via infrared optics or a radio standards such as Bluetooth®, Wi-Fi (IEEE 802.11), Wi-Max, Ultra-Wideband, Wireless USB, WiBro, near-field magnetics and HiperLAN standards.

An exemplary apparatus may also include a database 430. Database 430 may reside on computer 410 or it may reside on another computing device such as a server. Database 430 maintains a record of the battery inventory when scanned by scanner 420 via computer 410. Database 430 may include a subtending data table 435. Data table 435 may maintain data record associated with each make and model of battery approved of capable of being used by the system being served by the batteries and may also be downloaded from a server to computer 410 from time to time. FIG. 5 presents an exemplary representation of data table 435 with a number of exemplary data fields 510 that may be included in the table. Data table 435 may be used in conjunction with a method to inventory batteries such as the exemplary method presented in FIGS. 3A-3C.

Figure 6A:
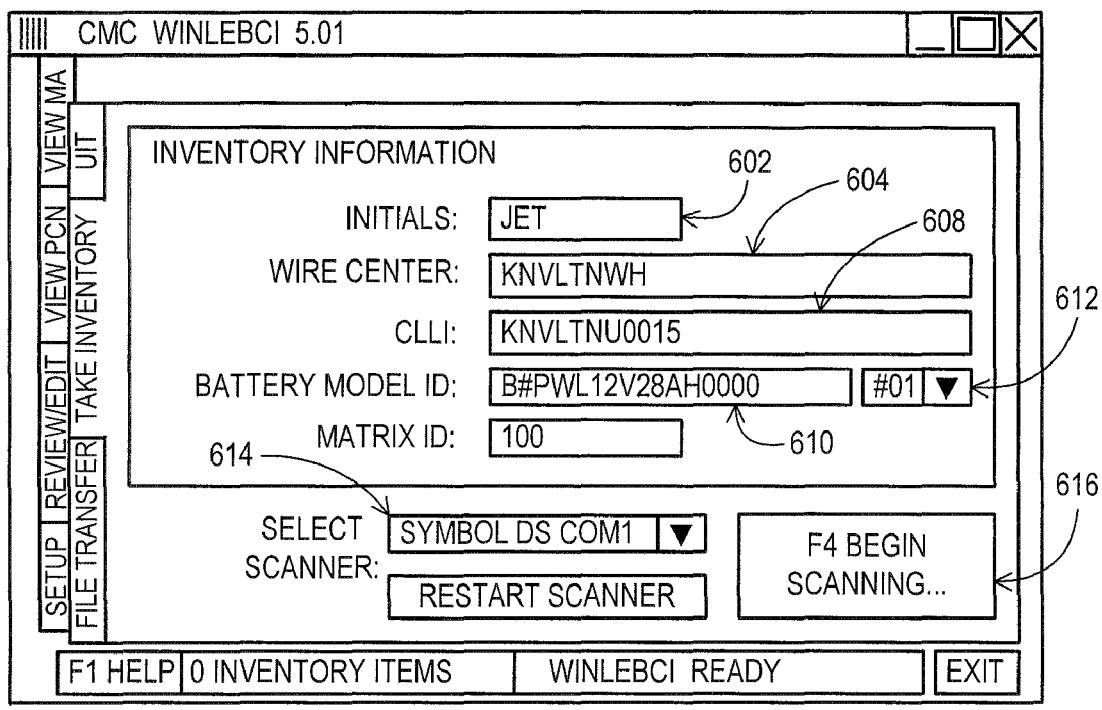
FIG. 6A is a screen shot of an exemplary Inventory Information GUI.
Figure 6B:
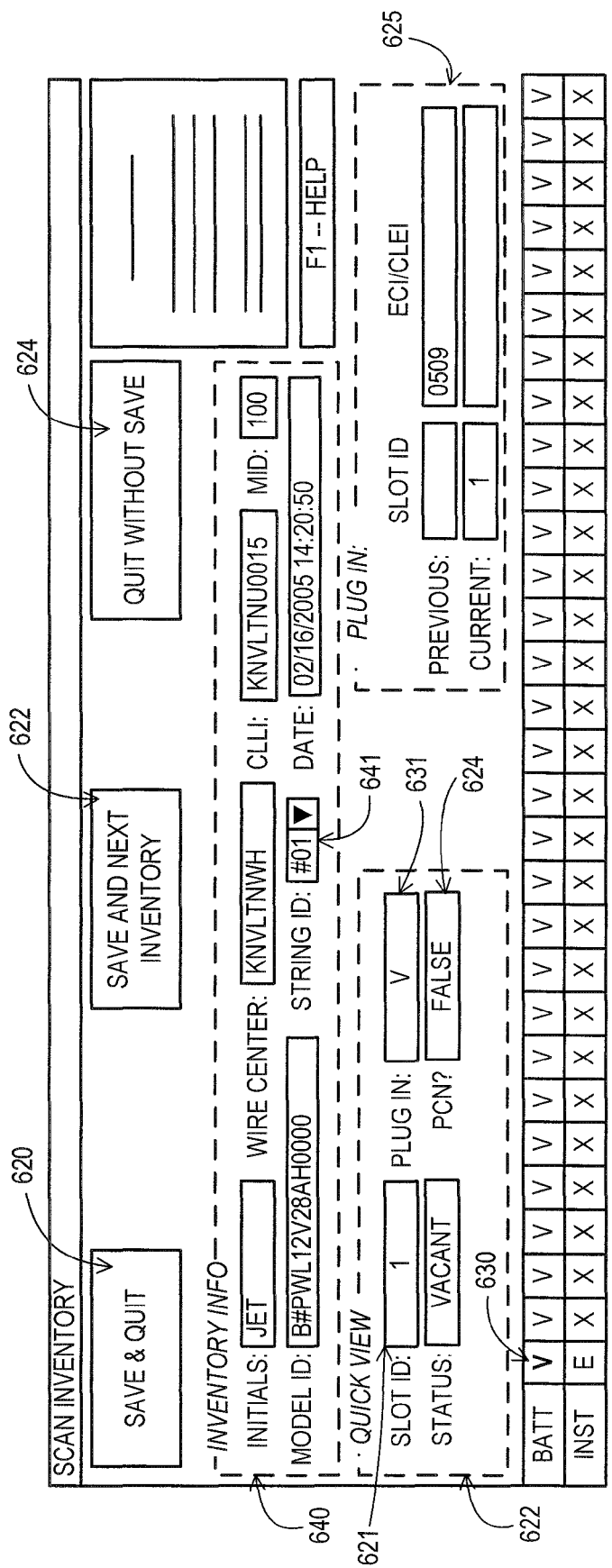
FIG. 6B is a screen shot of an exemplary scan inventory GUI.

Inventory software application 415 executing on computer 410, may create a graphical user interface ("GUI") 417, to facilitate the inventory process for the user. The GUI 417 may present one or more screens to a user to enter information. FIG. 6 presents two exemplary GUI screens. Screen 6A may be an exemplary inventory information input screen. Fields presented in FIG. 6A are exemplary data input fields. The "initials" field 602 allows the user to input his initials. The "wire center" field 604 allows the physical location where the inventory is being taken to be entered. The wire center field 604 may be filled manually or by scanning a bar code label associated with the location of the wire center. The "CLLI" field 608 may allow a specific location within the wire center to be recorded. As a non-binding example, the CLLI may be an electronics cabinet. "Battery Model ID" (or Battery ID) may be a type of equipment identification code. String field 612 may be the string number being inventoried. String 01 may be the default input until a user identifies the actual string being inventoried. A CLLI might have a single "string 01" regardless of the number of electronic cabinets at the CLLI. The "F4 Begin Scanning Button" 616, may allow the user to activate the scanner and begin scanning the data labels on a string of batteries in a particular CLLI.

Screen 6B is an exemplary Scan Inventory screen. Buttons 620, 622 and 624 provide the user the options to save a scanned inventory and quit, save the scanned inventory and perform another scan and to quit without saving the last inventory scan. The "Inventory Info" section of the screen may repeat data entered into previous screens or entered from database 430. The Quick View section of the screen may provide a snapshot of information about the battery being inventoried.

In this exemplary screen shot, the first battery position (i.e. "slot") 630 in battery string 01 is being selected. Each row may represent a unique string and each box a battery slot in that string. The "v" may indicate that the inventory position is vacant, an "E" may indicate that the slot is equipped and an "x" may indicate that the slot is not used. The capital "V" may indicate the specific battery position that is presently being viewed. In the exemplary Quick View section presented, the slot ID field 621 indicates that the first battery in the string 01 641 has been selected. The "Plug In" field 623 has returned a "v" and the "status" field 622 has returned the word "vacant". Both fields indicate that the battery slot in string 01 is vacant. If the battery slot was not vacant, the "Status" field 622 may return the word "Equipped" and the "Plug In" field 623 may return a code number for that particular batter such as a Battery ID. The "PCN" field 624 may be used for any ancillary information. For example, it may indicate whether or not there is a Producer Change Notice (i.e. a manufacturer recall). Screen 6B, includes a "Plug In" section 625. The "Plug In" section may indicate the previous slot that was inventoried and the current slot being inventoried. In the example presented, the first slot is being inventoried therefore the previous slot is blank. The "ECI/CLEI" field may display the equipment code for the current and previous batteries being inventoried.

Figure 7:
FIG. 7 is an exemplary reports menu.

As part of the method and system for managing battery inventory, the system described above may generate a number of reports to be used by the users of the system. FIG. 7, is an exemplary screen shot providing a menu of available reports collating and presenting data about a battery inventory collected by a battery inventory system. The listed reports are exemplary. More or different reports may be generated as required by a user.

FIG. 8A/8B is a sample inventory report. This particular exemplary Inventory Report is for wire center CRNTMSMA 810 in Mississippi. Within the wire center are 18 equipment cabinet/CLLIs 820. Each CLLI contains a specific model battery 830. From the report, it can be determined that CRN-TMSU5822 utilizes 8-6 volt batteries 870/840 manufactured by FIAMM 850. The total cost of the batteries (labor and material) is $1,488 880. Comparing columns 860 and 865 indicates that the existing batteries are nearing their forecast age of 6 years.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer assisted method to inventory batteries, comprising:
   detecting battery identification information associated with one or more batteries in a battery string;
   querying a user as to whether the battery string being inventoried is a first battery string at a location;
   if a reply is yes, then reading and recording the battery identification information;
   if the reply is no, then requesting and receiving an identity of the battery string being inventoried;
   determining a voltage magnitude for each of the one or more batteries in the battery string;
   aggregating the voltage magnitudes of the one or more batteries in the battery string,
   if the aggregate of the voltage magnitudes of the one or more batteries does not equal a required voltage then generating a first error message;
   if the aggregate of the voltage magnitudes of the one or more batteries equals the required voltage then saving the battery identification information; and
   if the battery string being inventoried has previously been recorded, then generating a second error message.

2. The computer assisted method of claim 1, wherein the battery identification information data includes a model identification data, wherein further the battery voltage is a component of the model identification data.

3. The computer assisted method of claim 2, further comprising:
   comparing the model identification data to a data record;
   if the model identification data does not match the data record then generating a third error message;
   if the model identification data matches the data record then accepting the battery identification information.

4. The computer assisted method of claim 1, wherein the first error message is an under voltage error message if the aggregate of the battery voltages in a string is less than 48 volts and an over voltage error message if the aggregate of the battery voltages in a string is more than 48 volts.

5. The computer assisted method of claim 1, wherein determining a voltage magnitude for each of the one or more batteries includes looking up the voltage magnitude in a data record.

6. The computer assisted method of claim 1, wherein the detecting of battery identification data is accomplished by a computing device equipped with one of a 2D scanner, an infrared scanning wand and a laser scanner.

7. A computer readable medium comprising processor executable instructions for performing a method, the method comprising:
   detecting battery identification data associated with a battery in a battery string, the battery identification data comprising a model identification data;
   determining a voltage magnitude for the battery as a component of the model identification data;
   if there is more than one battery in the battery string, repeating the detecting and determining instructions for each battery in the battery string until all batteries in the battery string have been detected and their voltage magnitude determined;
   aggregating the voltage magnitudes associated with each battery in the battery string,
   if the aggregate of the voltage magnitudes does not equal a required voltage then generating a first error message;
   if the aggregate of the voltage magnitudes equals the required voltage then storing the battery identification data associated with the one or more batteries in the battery string;
   comparing the model identification data to a data record;
   if the model identification data does not match the data record then generating a second error message; and
   if the model identification data matches the data record then accepting the battery identification data.

8. The computer readable medium of claim 7, wherein the first error message is an under voltage error message if the sum of the battery voltages in a string is less than 48 volts and an over voltage error message if the sum of the battery voltages in a string is more than 48 volts.

9. The computer readable medium of claim 7, wherein determining the voltage magnitude for each of the one or more batteries comprises looking up the voltage magnitude in a data record.

10. The computer readable medium of claim 7, further comprising instructions for:
- querying a user as to whether the battery string being inventoried is a first battery string at a location;
- if a user reply is yes, then readies and record the battery identification information;
- if the user reply is no, then request and receiving an receive the identity of the battery string being inventoried;
- if the battery string being inventoried has previously been recorded, then generating a third error message.

11. The computer readable medium of claim 7, further comprising instructions for scanning the battery identification data.